Patented May 25, 1948

UNITED STATES PATENT OFFICE 2,442,085

DRYING OIL-NEOPRENE RESINS

Curtis E. Huff and James H. Clynch, Mishawaka, Ind., assignors to United States Rubber Company, New York, N. Y., a corporation of New Jersey No Drawing. Application September 4, 1944, Serial No. 552,678

11 Claims. (Cl. 260—23)

This invention relates to improvements in thermal copolymer resins, suitable as plasticizers, or for varnishes, and particularly for footwear varnishes, to form tough elastic films.

We have discovered that such a copolymer resin is produced from thermally copolymerizing a vegetable or marine drying oil having an iodine number of at least 100, with a polymerized chloro-2-butadiene-1,3, known as polychloroprene (neoprene). The proportion of neoprene to oil may vary from 5 to 20 parts by weight for every 100 parts by weight of the oil, and is preferably on the order of 10 parts of neoprene per 100 parts of the oil.

For varnishes, the neoprene, preferably in the form of a cement in a suitable organic solvent, is blended with the drying oil. The blending is aided by dissolving separately part of the oil in the cement solvent, for example, toluol, and stirring the solution into the neoprene cement. Then the solvent is removed by heat, air, or otherwise, with vigorous stirring. The resulting mixture is then cooked at an elevated temperature, i. e., above 400° F., with stirring, until viscosity of the mix reaches about 300 centipoises (30 seconds on a #3 Zahn viscosity cup). This may be done by cooking at 450° F. for about 11–12 hours. In preparing a footwear varnish, the so prepared resin is dispersed in a suitable organic solvent, such as toluol, together with a desirable antioxidant, coloring material, accelerators, and metallic driers. For example, when natural or synthetic rubber shoes, such as Buna S, (butadiene-styrene copolymer) rubber shoes, are dipped in a varnish having the following recipe:

Parts by weight
Raw linseed oil—Neoprene GN copolymer (90:10) _____ 100
Dye (azo blue black) _____ 10
Accelerator (butyraldehyde-aniline) _____ 10
Accelerator (tetramethyl thiuram disulfide) _ 3
Nuodex (iron naphthenate drier) _____ 2
Toluol _____ 750

The finished shoes, after vulcanizing in an air-steam, ammonia cure at 260° F. for 3 hours, have good appearance, and withstand ageing better than finishes produced from a conventional linseed oil-sulfur type varnish.

If desired, natural resins, such as congo, rosin, manila, etc., or synthetic resins such as the phenolics, maleic anhydride derivatives, alkyds, and ester gums, may be incorporated in the recipe, for making the varnish.

Instead of linseed oil, other common drying oils such as cottonseed, dehydrated castor oil, sardine, tung oil, perilla, menhaden, etc., may be used.

Instead of toluol (toluene), any other suitable solvent for neoprene may be used, including aromatic hydrocarbons, such as benzene, xylene, chlorinated hydrocarbons such as chloroform, carbon tetrachloride, ethylene dichloride, propylene dichloride, trichlor ethylene, etc.

Other common varnish driers may be used, e. g., lead naphthenate, cobalt naphthenate which are suitable for rubber goods, and Japan drier, and manganese naphthenate which are suitable for non-rubber goods.

Instead of Neoprene GN, other commercial neoprenes, such as Neoprene G and CG may be used.

The thermal copolymer of drying oil and neoprene is also a good plasticizer for various polychloroprene compounds including Neoprene GN.

For plasticizer purposes, the neoprene cement, for example, 10 parts by weight of Neoprene GN dissolved in 50 parts by weight of a solvent, e. g., propylene dichloride—is dispersed into 90 parts by weight of raw linseed oil. The temperature is then raised slowly to about 450° F. where copolymerization is carried out. Cooking is continued until the viscosity is at least 720 centipoises at 450° F. This takes usually from 13 to 15 hours. A typical cooking viscosity time relationship is shown as follows:

| Time of Cooking, Hours | Viscosity Cps. at 450° F. |
|---|---|
| 2 | 50 |
| 4 | 50 |
| 6 | 50 |
| 7 | 55 |
| 9 | 60 |
| 11 | 90 |
| 12 | 135 |
| 13½ | 280 |
| 14 | 720 |

After the viscosity has reached 720 centipoises or more, the mix is allowed to cool to room temperature. The following example illustrates the use of the material as a plasticizer for neoprene compared with unplasticized neoprene:

Example 1

| | Parts by Weight | |
|---|---|---|
| | A | B |
| Neoprene (Neoprene GN) | 100 | 100 |
| Carbon Black | 10 | 10 |
| Whiting, Calcium Carbonate | 25 | 25 |
| Petrolatum | 4 | 4 |
| Stearic Acid | 2 | 2 |
| Zinc Oxide | 3 | 3 |
| Plasticizer—Linseed Oil-Neoprene | | 5 |
| | 144 | 149 |

These ingredients are mixed together on a rolling mill from which a sheet of .040 inch is taken and then vulcanized for 2 hours at 260° F. in an air and ammonia atmosphere at 40 pounds per square inch pressure.

| Property | A | B |
|---|---|---|
| Mixing time, minutes | 12 | 5 |
| Mooney plasticity | 18 | 13 |
| Per cent Kick-back sheeted at 190° F | 10 | 4 |
| Tensile | 2,440 | 2,760 |
| Ultimate Elongation | 840 | 830 |
| Permanent Set, per cent | 7 | 10 |

The plasticizer makes the neoprene stock smoother, it reduces the mixing time and percent kick-back, and it improves the tensile of the stock.

If it is desired to make a tackier plasticized neoprene stock, from 5 to 50 parts of a natural resin tackifier may be added to the drying oil-neoprene mix, preferably before cooking. Examples of such tackifiers are fused congo, wood rosin, damar, accroides, manilas, etc. The following example illustrates this:

*Example 2*

Parts by weight

Raw linseed oil _____ 90
Cement:
    Neoprene GN _____ 10
    Solvent (propylene dichloride) _____ 50
    Fused congo resin _____ 25
                                             175

These ingredients are cooked together at 450° F. until their viscosity has become over 800 centipoises. The plasticizer when added to Neoprene GN compounds increases the uncured tackiness of the stock and has similar plasticizing action to that mentioned above.

The viscosity at which cooking is discontinued varies somewhat with the type of oil and the ratio of the neoprene to the oil, and the presence or absence of a solvent, as shown herein, and as will be understood by those skilled in the art.

Having thus described our invention, what we claim and desire to protect by Letters Patent is:

1. A thermal copolymer of a drying oil selected from the class consisting of vegetable and marine oils having an iodine number in the range from 100 up to that for perilla oil and polychloroprene, the proportion of polychloroprene ranging from 5 to 20 parts by weight for every 100 parts by weight of the oil, said copolymer resulting from the application of heat above about 400° F. and for a time to form a homogeneous viscous resinous mass having a viscosity of above 90 centipoises measured at 450° F.

2. A thermal copolymer of linseed oil and polychloroprene, the proportion of polychloroprene ranging from 5 to 20 parts by weight for every 100 parts by weight of the oil, said copolymer resulting from the application of heat above about 400° F. and for a time to form a homogeneous viscous resinous mass having a viscosity of above 90 centipoises measured at 450° F.

3. A method of preparing a modified drying oil resin which comprises heating an admixture composed of 100 parts by weight of a drying oil selected from the class consisting of vegetable and marine oils having an iodine number in the range from 100 up to that for perilla oil, with from 5 to 20 parts by weight of polychloroprene, to a temperature above 400° F. until the mix reaches a viscosity measured at 450° F. of above 90 centipoises.

4. A method of preparing a modified drying oil resin which comprises heating an admixture composed of 100 parts by weight of linseed oil, with from 5 to 20 parts by weight of polychloroprene, to a temperature above 400° F. until the mix reaches a viscosity measured at 450° F. of above 90 centipoises.

5. A method of preparing a modified drying oil resin which comprises heating an admixture composed of 100 parts by weight of linseed oil, with from 5 to 20 parts by weight of polychloroprene, to a temperature above 400° F. until the mix reaches a viscosity measured at 450° F. of about 300 centipoises.

6. A varnish resin resulting from a process as set forth in claim 5.

7. A method of preparing a modified drying oil resin which comprises heating an admixture composed of 100 parts by weight of linseed oil, with from 5 to 20 parts by weight of polychloroprene, to a temperature above 400° F. until the mix reaches a viscosity measured at 450° F. of about 720 centipoises.

8. A plasticizer resin resulting from a process as set forth in claim 7.

9. A process of preparing a modified drying oil resin which comprises heating together 100 parts by weight of the oil selected from the class consisting of vegetable and marine drying oils, with about 5 to 20 parts by weight of polychloroprene, the oil having an iodine number in the range from 100 up to that for perilla oil, and the heating being carried out at an elevated temperature above 400° F. and for a time sufficient to form a homogeneous viscous resinous mass having a viscosity of above 90 centipoises measured at 450° F.

10. A process of preparing a modified drying oil resin which comprises heating together 100 parts by weight of the oil, with about 5 to 20 parts by weight of polychloroprene, the oil having an iodine number in the range from 100 up to that for perilla oil, and the heating being carried out an elevated temperature above 400° F. and for a time sufficient to form a homogeneous viscous resinous mass having a viscosity of at least 300 centipoises at 450° F.

11. A process of preparing a modified drying oil resin which comprises heating together 100 parts by weight of the oil, with about 5 to 20 parts by weight of polychloroprene, the oil having an iodine number in the range from 100 up to that for perilla oil, and the heating being carried out at an elevated temperature above 400° F. and for a time sufficient to form a homogeneous viscous resinous mass, and cooling to room temperature.

CURTIS E. HUFF.
JAMES H. CLYNCH.

REFERENCES CITED

The following references are of record in the file of this patent:

UNITED STATES PATENTS

| Number | Name | Date |
|---|---|---|
| 2,029,410 | Carothers et al. | Feb. 4, 1936 |
| 2,093,501 | Williams | Sept. 21, 1937 |
| 2,324,980 | Kilbourne | July 20, 1943 |

Certificate of Correction

Patent No. 2,442,085. May 25, 1948.

CURTIS E. HUFF ET AL.

It is hereby certified that errors appear in the printed specification of the above numbered patent requiring correction as follows: Column 4, line 43, claim 10, and line 53, claim 11, after the word "oil" and before the comma insert *selected from the class consisting of vegetable and marine drying oils*; line 47, claim 10, after "out" insert *at*; line 59, claim 11, after "mass" insert *having a viscosity of above 90 centipoises measured at 450° F.*; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*